Nov. 13, 1962 H. H. HOWARD ET AL 3,063,888
METHOD OF MAKING A WRAPPED FILTER TUBE OF
FIBERGLASS AND FORAMINOUS MATERIAL
Filed July 7, 1959 2 Sheets-Sheet 1

INVENTORS
Herbert H. Howard
BY Paul A. Smith
Robert A. Lubben

ATTORNEY

Nov. 13, 1962  H. H. HOWARD ET AL  3,063,888
METHOD OF MAKING A WRAPPED FILTER TUBE OF
FIBERGLASS AND FORAMINOUS MATERIAL
Filed July 7, 1959                                    2 Sheets-Sheet 2

INVENTORS
Herbert H. Howard
BY Paul A. Smith
Robert A. Lubben
ATTORNEY

United States Patent Office 3,063,888
Patented Nov. 13, 1962

3,063,888
METHOD OF MAKING A WRAPPED FILTER TUBE OF FIBERGLASS AND FORAMINOUS MATERIAL
Herbert H. Howard, Los Angeles, Paul A. Smith, Tarzana, and Robert A. Lubben, Hollywood, Calif., assignors to Permanent Filter Corporation, Los Angeles, Calif., a corporation of California
Filed July 7, 1959, Ser. No. 825,514
5 Claims. (Cl. 156—187)

The present invention relates to new and novel filtration equipment and more particularly to a method of manufacturing filter tubes which are particularly adapted to serve as water coalescers.

Modern hydrocarbon fuels such as used with jet aircraft and missiles, for example, must have most of the water removed therefrom in order to produce proper functioning of the power plants with which it is utilized. Accordingly, it has been a major problem in the art to produce equipment which will successfully remove the desired quantity of water from the fuel. In order to produce successful water separation, it is necessary to provide some sort of a coalescing means which serves to promote the growth of water droplets as it passes through the filtering equipment such that the water may be readily removed from the fuel by gravity.

It has been found that for the purpose of producing proper water droplet growth, filter tubes employing a plurality of layers of fiberglass are most effective. This type of filter tube generally comprises several layers of fiberglass which may be of varying coarseness, the fiberglass being in surrounding relationship to a relatively rigid central cylindrical member which is provided with perforations through the wall thereof. This assembly is then held in place by means of a suitable foraminous material surrounding the outside thereof, the foraminous material being in the form of screening or the like. With this construction, the filtered fluid generally enters the interior of the cylindrical member, and then passes through the perforations in the cylindrical member and through the various layers of fiberglass whereupon it emerges through the outermost layer of fiberglass and passes downstream of the assembly. As the filtered fluid passes through such an assembly, water droplet growth is obtained such that relatively large droplets of water are present as the filtered fluid emerges from the outermost layer of material and accordingly, these large water drops readily settle out of the filtered fluid into suitable sumps whereupon the water is removed from the sumps.

A major problem presents itself in successfully economically producing this type of filter tube since the structure thereof is rather complex. As a result, the expense and time consumed in manufacturing this type of assembly has proved to be excessive employing prior art procedures. The present invention is specifically directed toward a novel method of manufacturing such filter tubes in a very simple and efficient manner.

The present invention employs a novel concept in the manner in which the various layers of fiberglass and foraminous material are wrapped about a central cylindrical member. The cylindrical member is formed of a relatively rigid material and provided with perforations therethrough. The foraminous material is then wrapped around the cylinder and placed under tension, this tension being important to produce the desired degree of compression of the various layers of fiberglass, and accordingly obtain a predetermined overall diameter which remains substantially constant when a large number of tubes are produced.

A plurality of sheets of fiberglass are placed upon the upper surface of the foraminous material, these layers of fiberglass being of predetermined size and relative location so as to produce the desired end result whereby a first layer of fiberglass is provided completely around the cylinder, and a second layer of fiberglass is provided completely around the cylinder diametrically outwardly of the first layer of fiberglass, the second layer of fiberglass being constructed of fibers having a smaller diameter than that of the fibers of the first layer of fiberglass. A third layer of fiberglass is then provided completely around the cylinder diametrically outwardly of said second layer, the third layer being identical with the first layer.

These various layers of fiberglass are obtained in a very effective manner by rotating the inner cylinder so as to wrap the layers successively around the cylinder with the foraminous material being wound in a spiral manner about the cylinder.

After forming the aforementioned assembly, the ends thereof are sealed by means of both a liquid sealing means and a sealing means in the form of an elongated ribbon. After sealing the end portions, suitable relatively rigid end cap means are applied to the opposite end portions of the assembly, and the end portions are then heat-cured. After the heating thereof, additional sealing means is applied to the assembly to provide the finished unit.

The finished filter tube of the present invention is adapted to be employed especially with a porous tube formed for example of sintered bronze spheres which is preferably mounted within the cylinder and spaced therefrom, the porous tube being supported in proper operative position by means of the end caps provided at the opposite ends of the assembly. With this particular combination of elements, a very effective water-stripping action is obtained. It should be understood that the unit of the present invention in cooperation with the central porous tube is adapted to be mounted in a suitable header plate or like supporting structure within a large filter tank.

An object of the present invention is to provide a new and novel method of manufacturing filter tubes which are especially adapted to serve as water coalescing elements.

Another object is to provide a novel method of forming a filter tube including a central cylindrical member, surrounded by concentric layers of fibrous material.

A further object of the inventtion is the provision of a novel method for sealing the end portions of a filter tube assembly.

Yet another object of the invention is to provide a method of forming filter tubes which is quite simple and inexpensive in operation, and which requires little skill on the part of the operator, yet which is quite reliable and efficient.

Other objects and many attendant advantages of the invention will become more apparent when considered in connection with the specification and accompanying drawings, wherein.

Figure 1:
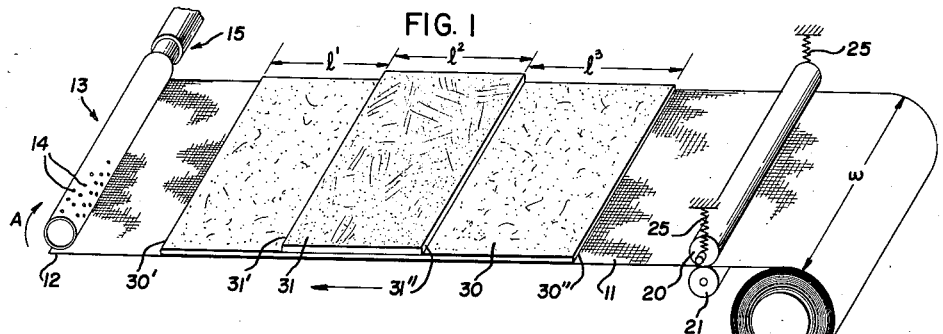
FIG. 1 illustrates in a schematic manner an initial position of the components as the manufacturing operation is initiated.

Referring now to the drawings wherein like reference characters designate corresponding parts throughout the several views, there is shown in FIG. 1 a large roll of foraminous material indicated generally by reference numeral 10, this foraminous materials being preferably in the form of insect screening which may comprise plastic or the like material which is adapted to be heat-sealed to itself in a well-known manner. The screening or foraminous material 10 includes a substantially horizontally extending portion 11 which has been unrolled from roll 10, screen 11 having an outer free end portion 12 which passes under a cylinder indicated generally by reference numeral 13.

Cylinder 13 is formed of a relatively rigid material such as brass, the cylinder being provided with numerous spaced perforations 14 formed through the wall thereof. The width of the foraminous material as indicated by arrows "W" is greater than the length of the elongated cylindrical member 13 such that when in the position shown in FIG. 1, the foraminous material extends beyond the opposite end portions of the cylindrical member for a purpose hereinafter set forth.

Cylinder 13 is suitably mounted upon a mandrel generally indicated by reference numeral 15, the cylinder being removably mounted on the mandrel, and mounted for rotation in the direction of arrow "A" when in operative position as shown, the mandrel being rotated by suitable power means (not shown). The sheet of foraminous material also extends between a pair of tension rollers 20 and 21 at a point spaced a substantial distance from the mandrel 15 and cylinder 13, roller 21 being mounted for free rotation about the rotary axis thereof as is roller 20, roller 20 being normally urged in a downward direction by spring means indicated schematically at 25. The tension rollers 20 and 21 operate in a well-known manner in cooperation with the rotary mandrel 15 to produce a certain predetermined tension on the sheet of foraminous material between the tension rollers and the cylinder. The amount of tension provided by rollers 20 and 21 is preferably adjusted so as to produce the required degree of tension on the sheet of material, this tension being important to produce the desired overall diameter of the finished unit.

After the foraminous material has been disposed as shown in FIG. 1, the end portion 12 of said material is first wrapped completely around the cylinder such that the end edge thereof is overlapped by a portion of the material. It is apparent that upon application of power to the mandrel 15, the sheet of material will then be placed under tension due to the action of the rollers 20 and 21.

As seen in FIG. 1, a first relatively flat sheet of fiberglass 30 is provided, this sheet having a width substantially equal to that of the foraminous material 11. Sheet 30 is preferably formed of fiberglass wool such as manufactured under the name "Fiberglas" by the Owens-Corning Glass Company, the sheet 30 being constructed of unbonded "B" fibers having an average diameter of .00010 to .00015 inch.

Sheet 30 as is seen is mounted on the upper surface of the portion 11 of the foraminous material, and a second sheet of fiberglass 31 is mounted at the central portion on the upper surface of the first sheet 30. The sheet 31 is preferably formed of unbonded "AA" fibers having an average diameter of .00003 to .00004 inch.

An important feature is the particular dimensions and disposition of the sheets 30 and 31. It is noted that the edge 30' of sheet 30 is spaced from the edge 31' of sheet 31 by a distance indicated by $L^1$. $L^1$ is of sufficient dimension to permit the portion of sheet 30 lying between edges 30' and 31' to be wrapped completely around the formed assembly with a slight overlap. Edges 31' and 31" of sheet 31 are spaced from each other by a distance $L^2$. Distance $L^2$ is sufficient to permit sheet 31 to be wrapped completely around the assembly also with a slight overlap. Edge 31" is spaced from edge 30" of sheet 30 by a distance $L^3$, distance $L^3$ being sufficient to wrap the portion of sheet 30 lying between edges 31" and 30" completely around the assembly with a slight overlap.

The portion of the foraminous material extending from the outer free end thereof to the point adjacent edge 30' of sheet 30 is sufficient to permit the foraminous material to be wrapped completely around the cylinder 13 with a slight overlap before the cylinder engages the sheet 30, thereby permitting the screen to be initially placed under tension before the fiberglass is wrapped around the cylinder. After the assembly has been set up as shown in FIG. 1, the foraminous material is wrapped around the cylinder and then the mandrel 15 is rotated placing the material under tension and drawing the material through the rollers 20 and 21 from the large roll 10.

Figure 2:
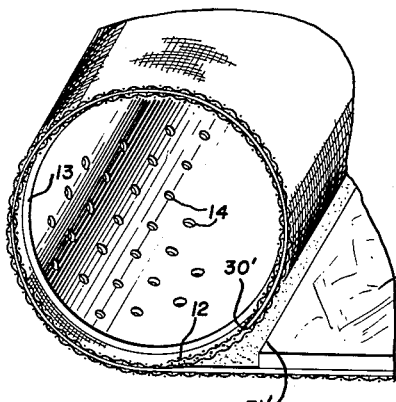
FIG. 2 illustrates a first step of the invention wherein the foraminous material has been completely wrapped around the cylinder, and the first layer of fiberglass has almost been completely wrapped around the cylinder due to rotation of the inner cylindrical member.

It is evident that as the cylinder 13 is rotated, the foraminous material as well as the sheets of fiberglass will be wrapped tightly around the cylinder. As seen in FIG. 2, the cylinder has been rotated such that end portion 12 of the foraminous material has been wrapped around the cylinder with a slight overlap, and the end edge 30' of the sheet 30 of fiberglass has been wrapped around the cylinder to a point where it is almost opposite the portion of sheet 30 adjacent the end edge 31' of the sheet 31. As the cylinder 13 is further rotated, the end edge 30' will overlap the portion of sheet 30 adjacent edge 31' of sheet 31, this overlap being in the order of 1½ inches in a typical construction wherein a cylinder of about 22½ inches length is employed and the finished diameter of the filter tube is approximately 2.6 inches.

Figure 3:
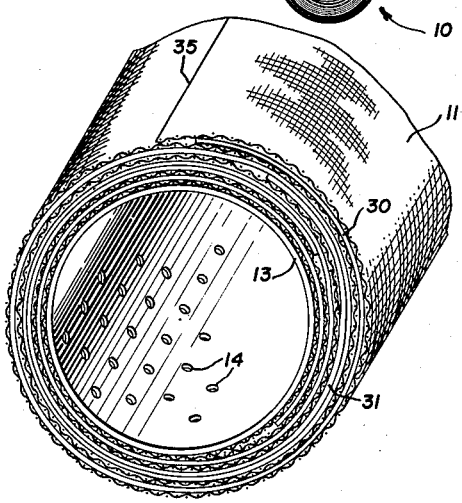
FIG. 3 illustrates the assembly at the completion of the turning action of the cylinder and after severing and sealing the foraminous material to itself.

The cylinder 13 is further rotated such that the layers 30 and 31 of fiberglass are successively wrapped around the cylinder, it being apparent that the foraminous material will be wound in a spiral manner and will be interposed between the different layers of fiberglass. It is further evident that the completed structure will include a first layer of "B" fibers, then a second layer of "AA" fibers and "B" fibers in abutting relationship with one another, and thirdly an outermost layer of "B" fibers. After having wrapped each of the layers of fiberglass completely around the cylinder, the foraminous material is severed and sealed to itself along a seam 35 as seen in FIG. 3. This severing and sealing operation may be performed at the same time when foraminous material such as plastic insect screening is used by passing a heating gun along the line 35 which serves to sever the screen and in addition to heat-seal it by fusion to the underlying portion of the insect screening formed of the same material. In this manner, the completed assembly is provided. As seen in FIG. 2, the foraminous material and the fiberglass extend laterally beyond the associated end portion of the cylinder. Accordingly, after completion of the assembly by heat-sealing along seam 35, it is necessary to remove those portions of the foraminous material and fiberglass which extend laterally outwardly of the cylinder. This is accomplished by employing suitable shears or other cutting means whereupon the opposite end portions of the foraminous material and the sheets of fiberglass are trimmed square with the ends of the cylinder 13. The completed assembly after this trimming operation is illustrated in FIG. 3.

Subsequent to the completion of the assembly, the end portions and the seam 35 are sealed by a suitable sealing substance. The preferred form of sealing substance according to the present invention is a plastic adhesive sold under the trade-mark "Pliobond" manufactured by the Goodyear Tire and Rubber Company of Akron, Ohio. The "Pliobond" initially employed is that which is sold as a liquid adhesive plastic sealing substance, an initial mixture of 30 percent "Pliobond" being cut with approximately 50 percent methyl ethyl ketone. This mixture is provided in a sump, and the end portions of the assembly are soaked in this sump for approximately one minute, the liquid in the sump having a depth of about ½ inch whereby the liquid sealing material saturates approximately ½ inch of the end portion of the assembly. It is evident that the opposite end portions will be sequentially dipped in this liquid mixture in order to saturate each end portion of the assembly.

After soaking the end portions of the assembly as described above, the assemblies are removed from the sealing material and allowed to dry for about one hour under ordinary atmospheric conditions. The end portions are then soaked in a straight 30 percent "Pliobond" liquid mixture for about one minute, whereupon the assembly is removed from the mixture and allowed to dry completely which requires at least three hours under normal atmospheric conditions. In addition, the "Pliobond" liquid mixture is also applied along seam 35 so as to extend on either side thereof, thereby providing an effective seal along the seam. The seam is sealed in two successive steps as are the end portions, or in other words, the first dip solution is firstly applied along the seam after which the second dip solution is applied along the seam.

Figure 4:
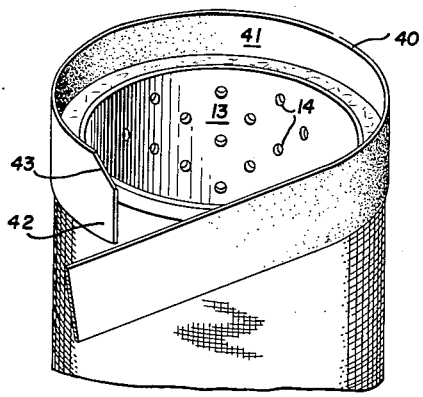
FIG. 4 illustrates a first step in the application of a sealing ribbon at one end portion of the assembly.
Figure 5:
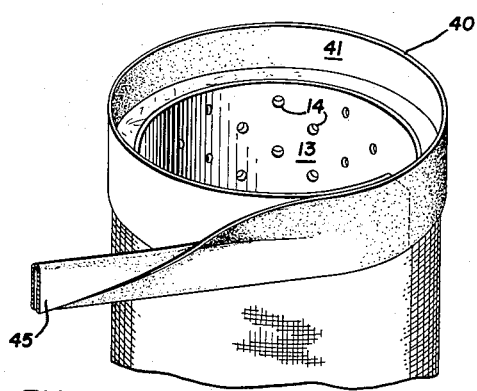
FIG. 5 illustrates a further step in the application of the sealing ribbon.
Figure 6:
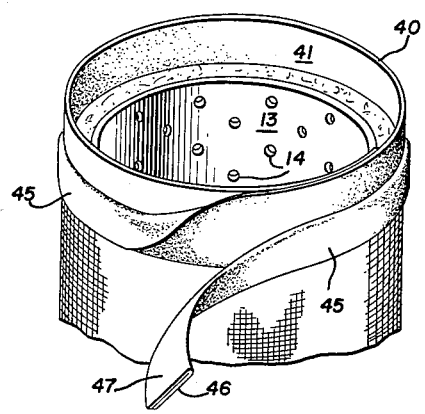
FIG. 6 illustrates a still further step in the application of the sealing ribbon.

After the assembly has been thoroughly dried, an additional sealing means is applied at each end of the assembly in the form of an elongated ribbon of "Pliobond" tape. The identical procedure is carried out at each end portion of the assembly, and accordingly the procedure used at only one end portion will be described, it being understood that the identical procedure is followed at the opposite end of the assembly. In a typical example, a .015 "Pliobond" tape having a width of one inch may be employed. Referring now to FIG. 4, a strip of "Pliobond" tape 40 has an inner surface 41 which is provided with an adhesive surface such that the tape may be adhesively secured to the outer surface of the assembly, it being evident that a portion of the tape extends upwardly as seen in FIG. 4 above the upper end of the assembly. A corner portion of the end 42 of the tape is cut off along line 43, and the tape is wrapped completely around the end portion of the assembly, it being understood that the tape is not actually cut off as shown in FIG. 4, but extends from a long roll and is only cut off after the tape is completely mounted in operative position. As seen in FIG. 5, after wrapping the tape completely around the end portion of the assembly in a single thickness, the tape is doubled over to provide a double thickness portion 45. This double thickness portion is then wrapped completely around the assembly as seen in FIG. 6 and then the tape is cut off to provide the finished end 46.

Figure 7:
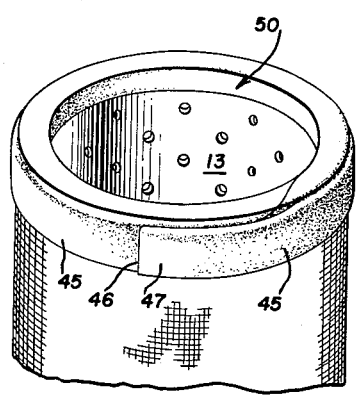
FIG. 7 illustrates the completed application of the sealing strip around one end portion of the assembly.

The end portion 47 of the tape is then secured to the outer surface of the doubled over portion as seen in FIG. 7 by cementing the end portion 47 with the use of the liquid "Pliobond" adhesive as discussed previously. As seen in FIG. 7, the portion of the tape which extends upwardly above the end portion of the assembly is folded down over the end of the assembly and into the cylindrical member such that in a typical example the tape extends about ⅜ inch down the outside of the assembly and thence around the end edge of the assembly and approximately ¼ inch down inside the assembly in engagement with the inner surface of the cylindrical member. The portion of the tape extending downwardly inside the assembly is indicated by reference numeral 50 in FIG. 7. The assembly is then in readiness for insertion of suitable end caps, but if the inner diameter of the open ends of the unit should be slightly too small, they can be enlarged by forming them on a bullet mandrel.

Figure 8:
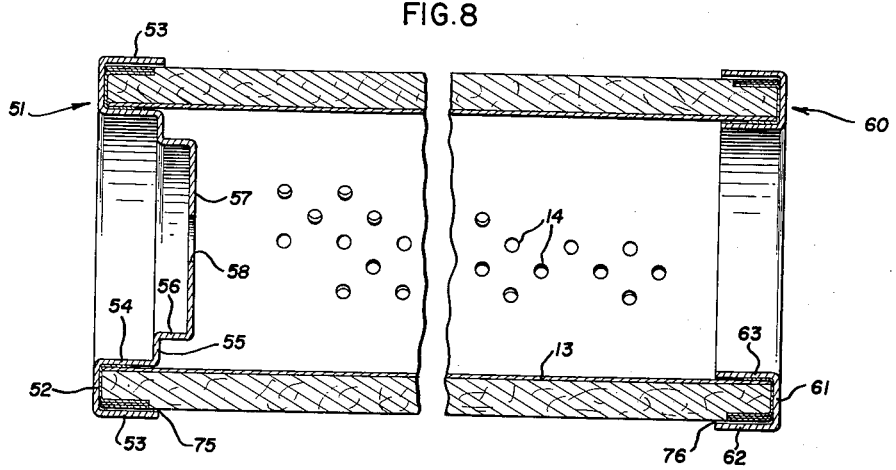
FIG. 8 illustrates the assembly after the application of suitable end caps.
Figure 8:
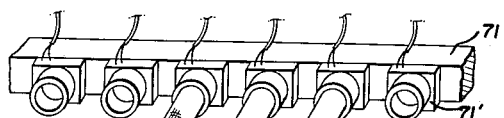

Referring now to FIG. 8, a first end cap indicated generally by reference numeral 51 is placed around one end of the assembly, end cap 51 including an annular portion 52 including an outer flange 53 extending normally therefrom, flange 53 being normally spaced a slight distance from the outersurface of the assembly. A second cylindrical flange 54 extends substantially normally from the inner edge of portion 52 and is disposed concentric with flange 53. Flange 54 is connected integrally with a second annular portion 55 which in turn includes an integral flange 56 extending substantially normally thereto. Flange 56 is in turn formed integrally with a flat circular portion 57 which is disposed substantially parallel to the annular portion 52 and has an opening 58 formed through the central portion thereof. Portion 57 and opening 58 provide a means for supporting a porous tube in place within the assembly.

It is evident that the end portion of the assembly is normally disposed within the annular cavity defined between portions 52 and 53 and 54 of the end cap 51.

An end cap indicated generally by reference numeral 60 is disposed about the opposite end portion of the assembly. End cap 60 includes an annular portion 61 having an outer flange 62 extending substantially normally therefrom and a second cylindrical flange 63 extending from the inner edge thereof and disposed concentric to flange 62. Portions 61, 62, and 63 of end cap 60 provide an annular cavity within which the associated end portion of the assembly is disposed.

After placing each of the end caps 51 and 60 about the respective end portions, the clearance between the outer surface of the tape on each end portion and the inner surface of the adjacent flanges formed on the end caps is checked.

This clearance in a typical example may be on the order of ¹⁄₃₂ to ¹⁄₁₆ inch. If the clearance is too great, the assembly with the end caps mounted thereon is lightly spun in a lathe to reduce the clearance to about ¹⁄₃₂ inch. After obtaining the proper clearance, the assembly with the end caps thereon is then suitably heat-cured.

Figure 9:
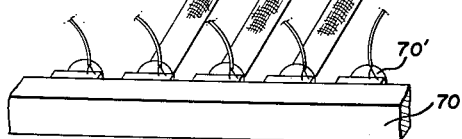
FIG. 9 illustrates the heat-curing step of the method.

Referring now to FIG. 9, a heating mechanism is schematically indicated as including two spaced bars 70 and 21 which are mounted for movement toward and away from one another. These bars are provided with heating fixtures 70' and 71' respectively which are provided with cylindrical openings adapted to snugly receive the end caps mounted on the opposite ends of the assembly. These heating units are energized by any suitable means such as a source of electricity (not shown).

Any suitable number of heating units may be provided thereby enabling a number of filter tubes to be heat-cured simultaneously. After the tubes are inserted in operative position as shown in FIG. 9 with the end caps thereof disposed within the heating units, the units are energized so as to heat the end portion of the assembly for a period of at least 2½ minutes at a temperature in the range of 300 to 325 degrees F. This heat-curing serves to melt the "Pliobond" tape and securely bond it both to the assembly itself and also to the end caps thereby providing an integral sealed unit.

After the heat curing step, additional liquid "Pliobond" sealing material is applied both at the end portions of the unit and also along the aforedescribed seam 35. The additional liquid "Pliobond" is applied along the annular lines of junction indicated by reference numerals 75 and 76 in FIG. 8 between the outer surface of the assembly and the outer flanges of the end caps. At least two additional coats of liquid bond are preferably employed both at the end portions and along the seam to insure that the unit will not leak at any joints and that filtered fluid passing therethrough will be forced to travel through each of the layers of fiberglass to produce the desired end result.

It is apparent from the foregoing that there is provided according to the present invention a new and novel method of manufacturing filter tubes which are especially adapted to act as water coalescers. A novel method is provided for providing a central cylindrical member with a plurality of substantially concentric layers of fiberglass therearound. A novel method is also provided for sealing the opposite end portions of the assembly. The method according to the present invention is quite simple and inexpensive, and requires little skill in the performance thereof, and yet is quite reliable and efficient.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

We claim:

1. The method of manufacturing a filter tube which comprises wrapping one end portion of a strip of foraminous material completely around a relatively rigid perforated cylinder with the free end edge of the strip of foraminous material overlapped by another portion thereof, placing the strip of foraminous material under tension, placing a first sheet of fiberglass on the upper surface of the strip of foraminous material, placing a second sheet of fiberglass on the central portion of the upper surface of the first sheet of fiberglass with the first sheet of fiberglass extending longitudinally of the foraminous strip from opposite edges of the second sheet of fiberglass material, the second sheet of fiberglass being formed of fibers having a diameter less than the diameter of the fibers of the first sheet of fiberglass, rotating the cylinder so as to first wrap a portion of the first sheet of fiberglass completely around the cylinder, wrapping the second sheet of fiberglass completely around the cylinder, wrapping another portion of the first sheet of fiberglass completely around the cylinder and overlapping a portion of the foraminous material with itself, and sealing the other end of the strip of foraminous material with another portion of the foraminous material to form an assembly, and sealing the opposite ends of the assembly.

2. The method of manufacturing a filter tube comprising wrapping one end of a sheet of foraminous material completely around a relatively rigid perforated cylinder, placing a first sheet of fiberglass on said foraminous material, placing a second sheet of fiberglass on said first sheet of fiberglass so as to be in contact therewith, wrapping said sheet of foraminous material with the layers of fiberglass around said cylinder, securing the outer free end of the sheet of foraminous material to a portion thereof wrapped around the cylinder for securing said sheets of fiberglass in operative position and defining an assembly, and completely sealing opposite end portions of the assembly.

3. The method of manufacturing a filter tube which comprises wrapping a free end of a sheet of foraminous material completely around a cylinder with the free end of the sheet overlapped by a portion of the sheet, placing the sheet of foraminous material under tension, placing a first sheet of fiberglass on the upper surface of said sheet of foraminous material, placing a second sheet of fiberglass on said first sheet of fiberglass, the second sheet of fiberglass containing fibers of substantially less diameter than the fibers of the first sheet of fiberglass, said second sheet of fiberglass being disposed at the central portion of the first sheet of fiberglass with the first sheet of fiberglass extending in a direction longitudinally of the sheet of foraminous material beyond the opposite edges of the second sheet of fiberglass, rotating said cylinder so as to wrap said sheet of foraminous material and said sheets of fiberglass tightly around the cylinder, so that the sheet of foraminous material is spirally wound around the cylinder with the layers of fiberglass and said sheet is interposed between the different layers of fiberglass, severing said sheet of foraminous material and sealing the severed end thereof to another portion of the foraminous material to provide an assembly, and applying sealing means to opposite ends of the assembly.

4. The method of manufacturing a filter tube which comprises wrapping one end portion of an elongated strip of foraminous material completely around a relatively rigid perforated cylinder with the free end edge of the strip of foraminous material overlapped by another portion thereof, placing the strip of foraminous material under tension, placing a first sheet of fiberglass on the upper surface of the strip of foraminous material, placing a second sheet of fiberglass on the central portion of the upper surface of said first sheet of fiberglass with the first sheet of fiberglass extending longitudinally of the foraminous strip from opposite edges of the second sheet of fiberglass material, said second sheet of fiberglass being formed of fibers having a diameter less than the diameter of the fibers of the first sheet of fiberglass, rotating said cylinder so as to first wrap a portion of the first strip of fiberglass around said cylinder with a slight overlap, wrapping said second sheet of fiberglass around said cylinder with a slight overlap, wrapping another portion of said first sheet of fiberglass around said cylinder with a slight overlap, overlapping a portion of the foraminous material with itself, severing said sheet of foraminous material and sealing the severed end thereof with another portion of the foramious material to form an assembly, applying liquid sealing material to the opposite end portions of the assembly, drying said opposite end portions of the assembly, applying a ribbon of sealing material about each end portion of the assembly with the ribbon extending downwardly along the inner surface as well as the outer surface of the assembly, placing relatively rigid end cap means about each end portion of the assembly, heating the opposite end portions of the assembly, and applying additional liquid sealing material to the opposite end portions of the assembly and along the seam defined by the connection between the severed end of the foraminous material and the adjacent portion of the foraminous material.

5. The method as defined in claim 4, wherein said strip of foraminous material and said first and second layers of fiberglass are originally provided with widths greater than the length of said cylindrical member and including the step of cutting off the strip of foraminous material and the layers of fiberglass square with the ends of the cylinder subsequent to severing and securing the severed end of the strip of foraminous material to itself.

References Cited in the file of this patent

UNITED STATES PATENTS

| 2,383,066 | McDermott | Apr. 21, 1945 |
| 2,525,330 | Zaun | Oct. 10, 1950 |
| 2,537,897 | Hunter | Jan. 9, 1951 |
| 2,564,637 | Chase | Aug. 14, 1951 |
| 2,639,251 | Kracklauer | May 19, 1953 |
| 2,656,929 | Dolan | Oct. 27, 1953 |
| 2,663,660 | Layte | Dec. 22, 1953 |
| 2,724,176 | White | Nov. 22, 1955 |
| 2,739,916 | Parker | Mar. 27, 1956 |
| 2,742,160 | Fogwell | Apr. 17, 1956 |
| 2,746,607 | Hess | May 22, 1956 |
| 2,800,232 | Marvel | July 23, 1957 |
| 2,835,393 | Buckman | May 20, 1958 |
| 2,875,901 | Bottum | Mar. 3, 1959 |
| 2,911,101 | Robinson | Nov. 3, 1959 |
| 2,947,419 | Kasten | Aug. 2, 1960 |

FOREIGN PATENTS

| 709,897 | Great Britain | June 2, 1954 |